United States Patent [19]
Fukumoto

[11] Patent Number: 5,546,237
[45] Date of Patent: Aug. 13, 1996

[54] EYEPIECE

[75] Inventor: Satoshi Fukumoto, Tokyo, Japan

[73] Assignee: Nikon Corporation, Tokyo, Japan

[21] Appl. No.: 269,673

[22] Filed: Jul. 1, 1994

[30] Foreign Application Priority Data

Jul. 2, 1993 [JP] Japan .................................. 5-188688

[51] Int. Cl.$^6$ ...................................................... G02B 9/06
[52] U.S. Cl. ............................................. 359/794; 359/708
[58] Field of Search ..................................... 359/791, 792, 359/794, 767, 768, 769, 779, 780, 708

[56] References Cited

U.S. PATENT DOCUMENTS 4,183,624  1/1980  Rogers et al. ...................... 350/175 E Primary Examiner—Georgia Y. Epps
Assistant Examiner—Dawn-Marie Bey
Attorney, Agent, or Firm—Michael N. Meller

[57] ABSTRACT

An eyepiece which has a simple lens group construction of a relatively small number of lenses and which is reduced in aberration and increased in field angle. The eyepiece includes, as arranged in the order from an eyepoint side, a first lens group of a positive refractive power composed of a cemented lens of a negative lens and a positive lens, and a second lens group of a positive refractive power composed of a single positive lens. With the positive lens of the second lens group, at least one of the lens surfaces is an aspherical surface. With f representing the focal length of the eyepiece, $f_1$ the focal length of the first lens group, and D the spacing between the first and second lens groups, the eyepiece satisfies the following conditions.

1.05 $f_1/f$<2.5

D/f<0.9

5 Claims, 3 Drawing Sheets

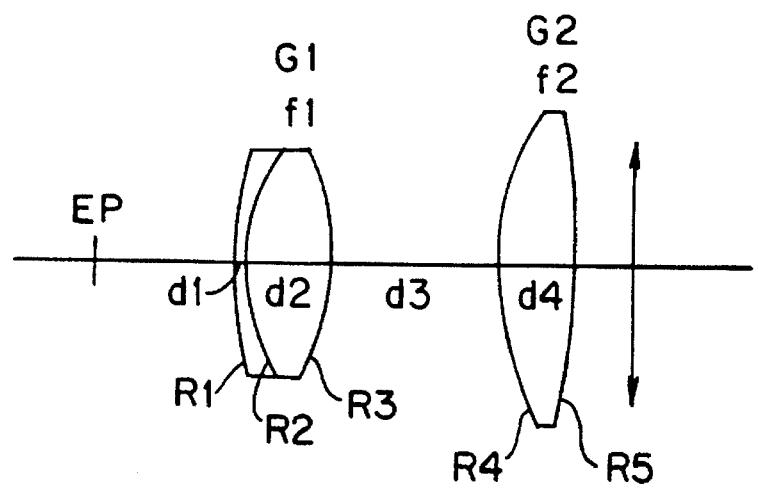
FIG. 1
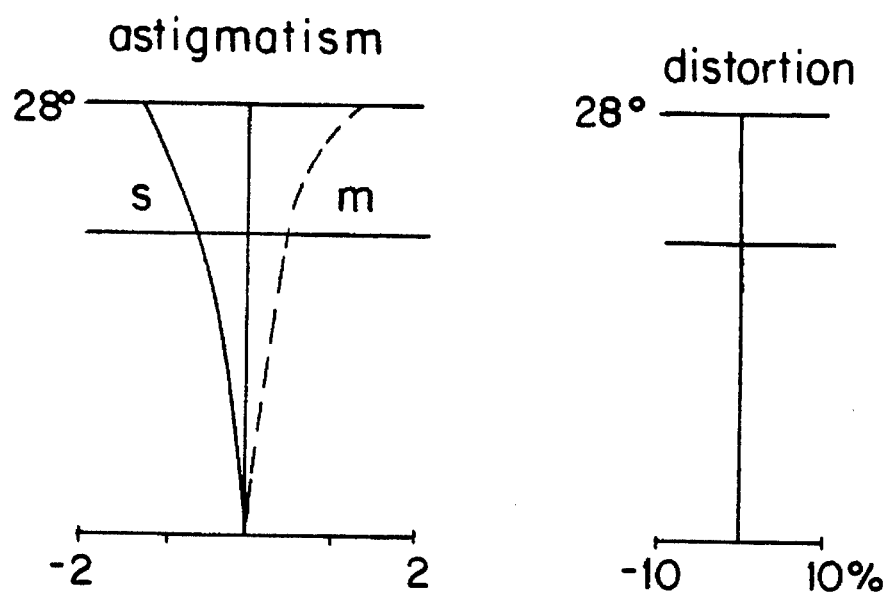
FIG. 2a
FIG. 2b

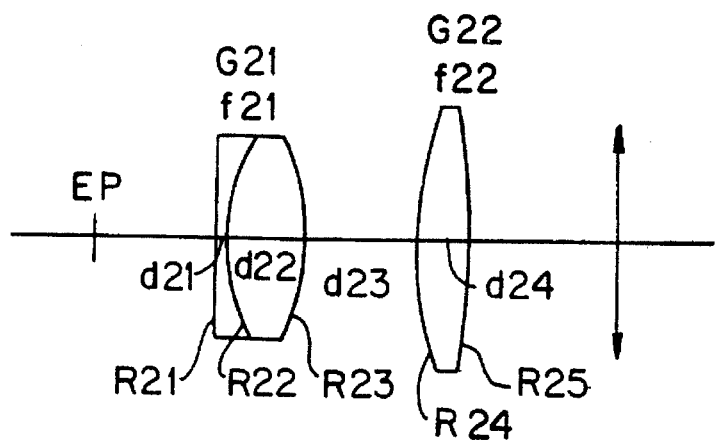
FIG. 5
PRIOR ART
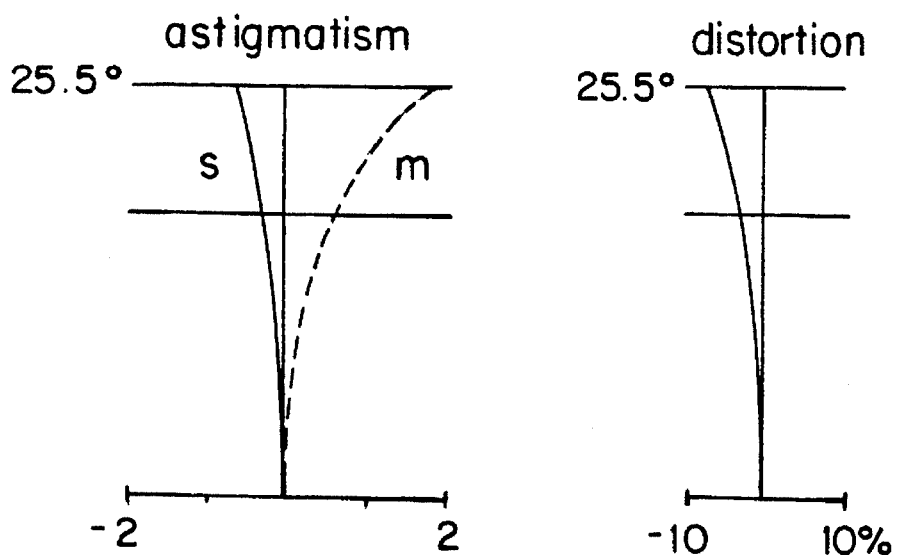
FIG. 6a
PRIOR ART
FIG. 6b
PRIOR ART

EYEPIECE

BACKGROUND OF THE INVENTION

1. Field of the Invention

The present invention relates to an eyepiece suited for use for example in telescopes and microscopes.

2. Related Background Art

Usually, such optical instrument as a telescope or microscope uses an eyepiece for further magnifying and observing a real image formed by an objective lens. Referring now to FIG. 5, there is illustrated an example of the conventional eyepieces.

This example shows an eyepiece including, in the order from the eyepoint (E.P) side, a first lens group $G_{2\,1}$ composed of a cemented lens of a negative lens and a positive lens and having a positive refractive power and a second lens group $G_{2\,2}$ composed of a single positive lens component. This eyepiece has a focal length f of 19.8 mm, an apparent field of view of 51°, an eye relief of 10.3 mm, a focal length $f_{2\,1}$ of the first lens group $G_{2\,1}$ of 31.9 mm, a focal length $f_{2\,2}$ of the second lens group $G_{2\,2}$ of 37.2 mm, and a spacing D of 8.9 mm between the first lens group $G_{2\,1}$ and the second lens group $G_{2\,2}$.

The following Table 1 shows the parameter values of this eyepiece. Here, $r_i$ represents the radius of curvature of a lens surface $R_{2\,i}$, $d_i$ the surface spacing on the optical axis between the lens surface $R_{2\,i}$ and a lens surface $R_{2\,i+1}$, $n_i$ the d-line refractive index of the medium between the lens surface $R_{2\,i}$ and the lens surface $R_{2\,i+1}$, and $v_i$ the Abbe number of the medium between the lens surfaces $R_{2\,i}$ and $R_{2\,i+1}$.

TABLE 1

| $R_i$ | $r_i$ | $d_i$ | $n_i$ | $v_i$ |
|---|---|---|---|---|
| $R_{21}$ | 232.5 | 1.1 | 1.728 | 28.3 |
| $R_{22}$ | 15.5 | 6.7 | 1.603 | 60.6 |
| $R_{23}$ | −17.0 | 8.9 | | |
| $R_{24}$ | 31.9 | 4.3 | 1.620 | 60.1 |
| $R_{25}$ | −79.0 | | | |

With such conventional eyepiece having a relatively large field angle (e.g., an apparent field of view of over 40°), a relatively large pupil aberration appears as will be seen from FIG. 6. To provide a fully satisfactory aberration compensation even for the peripheral portion of the visual field by such eyepiece gives rise to a problem that the addition of a compensation optical system for this purpose is required and the number of lenses used in the eyepiece system as a whole is inevitably increased. Particularly, the compensation of such aberrations as distortion aberration is difficult thus tending to result in a lens construction including 4 to 6 lenses.

SUMMARY OF THE INVENTION

It is an object of the present invention to provide an eyepiece which overcomes the foregoing deficiencies in the prior art and is capable of satisfactorily compensating various aberrations despite its simple construction including a reduced number of lenses.

To accomplish the above object, in accordance with a first aspect of the present invention there is thus provided an eyepiece including in the order from its eyepoint side:

a first lens group having a positive refractive power, and a second lens group having a positive refractive power, said first lens group having a cemented lens formed by cementing a negative lens and a positive lens together, said second lens group having another positive lens, said positive lens in said second lens group having at least one lens surface composed of an aspherical surface, said eyepiece further including a lens construction which satisfies the following conditions (1) and (2)

$$1.05 < f_1/f < 2.5 \qquad (1)$$

$$D/f < 0.9 \qquad (2)$$

where f=the focal length of the eyepiece, $f_1$=the focal length of the first lens group, D=the spacing between the first and second lens groups.

The eyepiece of the present invention has the lens construction including, in the order from the eyepoint side, the first lens group including a cemented lens of a negative lens and a positive lens and having a positive refractive power and the second lens group including another positive lens and having a positive refractive power, and at least one of the lens surfaces of the positive lens of the second lens group is in the form of an aspherical surface.

Thus, in accordance with the eyepiece of this invention the pupil aberration appearing as a distortion aberration in the conventional eyepiece comprised of the spherical lenses alone can be compensated for by the aspherical surface formed on at least one of the lens surfaces of the second lens group, with the result that there is no need to provide any extra aberration compensation optical system in the eyepiece and the whole eyepiece optical system is of the simple construction composed of the reduced number of lenses.

Further, with the eyepiece according to the present invention, the previously mentioned conditions (1) and (2) are satisfied if f represents the focal length of the eyepiece, $f_1$ the focal length of the first lens group and D the spacing between the first and second lens groups.

The condition (1) relates to the optimum power of the positive lens in the first lens group. Generally, where the image plane and the lens surface are close to each other, any dust or flaws on the lens surface appear within the observing visual field thus requiring to design in a manner that the image plane and the lens surface are spaced apart by a certain distance and consideration of this fact requires that the condition (1) be satisfied.

Where the lower limit of the condition (1) or $f_1/f$ is less than 1.05, the power of the first lens group is increased and its burden is also increased, thus increasing the various aberrations, particularly the astigmatism. On the other hand, where the upper limit of the condition (1) or $f_1/f$ is over 2.5, the power of the second lens group becomes excessively high and the burden becomes excessively large for the positive lens in the second lens group, thus making it difficult to ensure a satisfactory aberration compensation.

The condition (2) relates to the spacing D between the first lens group and the second lens group. Where the distance between the image plane and the second lens group is increased so that the value of D/f exceeds 0.9, eventually the eye relief is decreased and this is undesirable.

Therefore, if the conditions (1) and (2) are both satisfied, there is no danger of the astigmatism becoming unnecessarily large and also a satisfactory eye relief is always obtained.

BRIEF DESCRIPTION OF THE DRAWINGS

FIG. 1 shows schematically the construction of an eyepiece according to a first embodiment of the present invention.

FIG. 2A is an aberration diagram of the astigmatism for the eyepiece according to the first embodiment shown in FIG. 1;

FIG. 2B is an aberration diagram of the distortion for the eyepiece according to the first embodiment shown in FIG. 1;

FIG. 5 shows schematically the construction of a conventional eyepiece.

FIG. 6A is an aberration diagram of the astigmatism for the conventional eyepiece shown in FIG. 5;

FIG. 6B is an aberration diagram of the distortion for the conventional eyepiece shown in FIG. 5.

DESCRIPTION OF THE PREFERRED EMBODIMENTS

Figure 3:
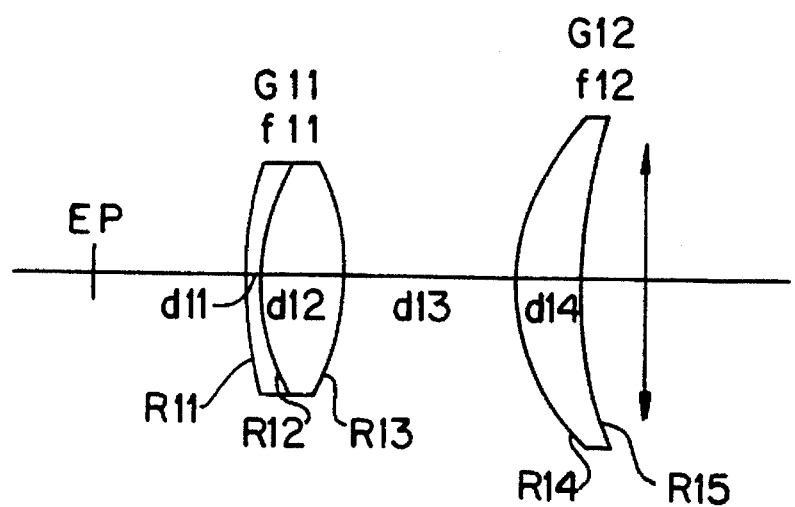
FIG. 3 shows schematically the construction of an eyepiece according to a second embodiment of the present invention.

Referring to FIG. 1, there is illustrated a schematic lens construction diagram for an eyepiece according to a first embodiment of the present invention. The eyepiece of this embodiment comprise, in the order from the eyepoint (EP) side, a first lens group $G_1$ of a positive refractive power composed of a cemented lens formed by cementing a negative lens and a positive lens together, and a second lens group $G_2$ of a positive refractive power composed of a single positive lens.

Then, the negative lens of the cemented lens forming the first lens group $G_1$ includes a meniscus lens having its convex surface turned toward the eyepoint EP side, and the positive lens of the cemented lens includes a lens having convex surfaces turned to both sides.

On the other hand, the positive lens forming the second lens group $G_2$ is composed of a lens made of a resinous optical material and having convex surfaces turned to both sides, and an eyepoint-side lens surface $R_4$ of the second lens group $G_2$ is shaped into an aspherical surface which is given by the following equation $$x = \frac{C_0 y^2}{1 + (1 - kC_0^2 y^2)^{1/2}} + C_4 y^4 + C_6 y^6 + C_8 y^8 + C_{10} y^{10} \quad (3)$$

where x=the distance measured from the apex in the optical axis direction y=the distance measured from the apex in a direction perpendicular to the optical axis k=the conic constant $C_0 = 1/r$ r=the radius of curvature at the apex $C_2$, $C_4$, $C_6$, $C_8$, $C_{10}$=the second-order, fourth-order, sixth-order, eighth-order and tenth-order aspherical coefficients.

The focal length f of this eyepiece is 19.8 mm, the apparent field of view is 56°, the eye relief is 11.3 mm, the focal length $f_1$ of the first lens group $G_1$ is 26.0 mm, the focal length $f_2$ of the second lens group $G_2$ is 31.7 mm, and the spacing D between the first and second lens groups $G_1$ and $G_2$ is 14.0 mm.

The following Table 2 shows the parameter values of this eyepiece. Here, represented by $r_i$ is the radius of curvature of a lens surface $R_i$, $d_i$ the surface spacing along the optical axis between the lens surface $R_i$ and a lens surface $R_{i+1}$, $n_i$ the d-line refractive index of the medium between the lens surface $R_i$ and the lens surface $R_{i+1}$, and $v_i$ the Abbe number of the medium between the lens surface $R_i$ and the lens surface $R_{i+1}$

TABLE 2

| $R_i$ | $r_i$ | $d_i$ | $n_i$ | $v_i$ |
|---|---|---|---|---|
| $R_1$ | 38.8 | 1.0 | 1.741 | 27.6 |
| $R_2$ | 15.3 | 6.7 | 1.589 | 61.1 |
| $R_3$ | −19.2 | 14.0 | | |
| $R_4$ | 18.9 | 5.7 | 1.491 | 57.6 |
| $R_5$ | −78. 6 | | | |

$R_4$: aspherical surface k = −0.6445
$C_2 = 0$
$C_4 = -0.225 * 10^{-4}$
$C_6 = -0.14655 * 10^{-7}$
$C_8 = -0.65 * 10^{-10}$
$C_{10} = 0.27091 * 10^{-12}$ Referring now to FIG. 2, there is illustrated an aberration diagram for the eyepiece according to the present embodiment and the illustrated astigmatism and distortion aberration are provided by the measurement results obtained by tracing the light beam from the eyepoint side. A comparison with the case of the conventional eyepiece shown in FIG. 6 shows that despite the wider apparent field of view of the present embodiment, the aberrations, particularly the distortion aberration is reduced.

Referring now to FIG. 3, there is illustrated the construction of an eyepiece according to a second embodiment of the present invention. The eyepiece of this embodiment includes, in the order from the eyepoint side, a first lens group $G_{1\ 1}$ of a positive refractive power composed of a cemented lens of a negative lens and a positive lens and a second lens group $G_{1\ 2}$ of a positive refractive power composed of a single positive lens. In the cemented lens forming the first lens group $G_{1\ 1}$, the negative lens includes a meniscus lens having a convex surface turned to the eyepoint EP side and also the positive lens includes a lens having convex surfaces turned to the both sides. The positive lens forming the second lens group $G_{1\ 2}$ is composed of a lens made of a resinous optical material and having its convex surface turned to the eyepoint side and the other lens surface, i.e., the lens surface $R_{1\ 5}$ turned to the side (the right side in FIG. 3) of an objective lens which is not shown is formed into an aspherical shape which is given by equation (3) in the like manner as the lens surface $R_4$ in the previously-described first embodiment.

In the second embodiment, the focal length f of the eyepiece is 19.8 mm, the apparent field of view is 56°, the eyerelief is 12.0 mm, the focal length $f_{1\ 1}$ of the first lens group $G_{1\ 1}$ is 26.5 mm, the focal length $f_{1\ 2}$ of the second lens group $G_{1\ 2}$ is 32.2 mm and the spacing D between the first lens group $G_{1\ 1}$ and the second lens group $G_{1\ 2}$ is 13.5 mm.

The following Table 3 shows the parameter values of this eyepiece. Here, represented by $r_i$ is the radius of curvature of a lens surface $R_{1\ i}$, $d_i$ is the surface spacing on the optical axis between the lens surface $R_{1\ i}$ and a lens surface $R_{1\ i+1}$, $n_i$ is the d-line refractive index of the medium between the lens surface $R_{1\ i}$ and $R_{1\ i+1}$, and $v_i$ is the Abbe number of the medium between the lens surfaces $R_{1\ i}$ and $R_{1\ i+1}$.

TABLE 3

| $R_i$ | $r_i$ | $d_i$ | $n_i$ | $v_i$ |
|---|---|---|---|---|
| $R_{11}$ | 31.6 | 1.0 | 1.741 | 27.6 |
| $R_{12}$ | 15.5 | 6.3 | 1.589 | 61.1 |
| $R_{13}$ | −23.0 | 13.5 | | |
| $R_{14}$ | 17.0 | 5.5 | 1.491 | 57.6 |
| $R_{15}$ | −196.9 | | | |

Figures 4A, 4B:
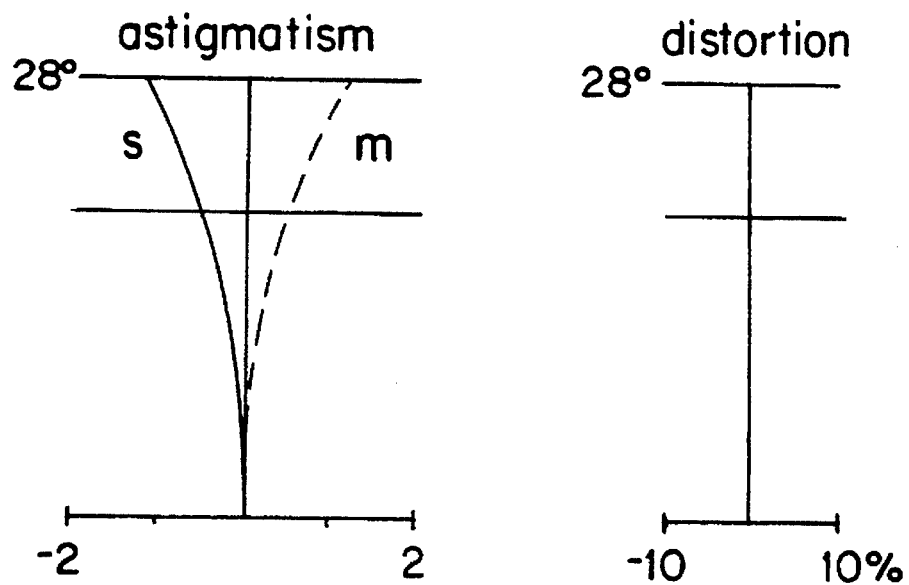
FIG. 4A is an aberration diagram of the astigmatism for the eyepiece according to the second embodiment shown in FIG. 3.
FIG. 4B is an aberration diagram of the distortion for the eyepiece according to the second embodiment shown in FIG. 3.

$R_{15}$: aspherical surface $k = -2320.19$
$C_2 = 0$
$C_4 = 0.78577 * 10^{-4}$
$C_6 = 0.13478 * 10^{-6}$
$C_8 = -0.14962 * 10^{-8}$
$C_{10} = 0.38734 * 10^{-11}$ FIG. 4 shows an aberration diagram for the eyepiece according to the second embodiment and the illustrated astigmatism and distortion aberration are provided by the measurement results obtained by tracing the light beam from the eyepoint side. From a comparison with FIG. 6 showing the aberrations of the conventional eyepiece it will be seen that the eyepiece of the present embodiment is particularly improved in distortion aberration over the conventional eyepiece despite its wider apparent field of view.

Also, each of the embodiments shown in FIGS. 1 and 3 shows the increased eye relief over the conventional eyepiece. This is due to the effect of employing the aspherical lens for the second lens group of a positive refractive power. In other words, when the light beam transmitted through the second lens group having the aspherical lens passes over the optical axis, its point of passage is closer to the point of passage of the light beam in the absence of any eyepoint-side pupil aberration as compared with the point of passage over the optical axis of the light beam transmitted through the second lens group composed of only the spherical surfaces. Thus, in accordance with the present invention the eye relief is increased at least in an amount corresponding to the compensation of the pupil aberration.

It is to be noted that while the above-described embodiments show the cases where the apparent field of view is 56°, in accordance with the present invention satisfactory optical performance can be maintained up to about 65 ° of the apparent field of view if increase in lens diameter can be admitted.

Further, while, in these embodiments, the resinous optical material is used for the second lens group in view of the advantage in manufacturing cost, it is needless to say that the present invention is not limited thereto and there is no danger of any trouble even if optical glass is used singly or in combination.

From the foregoing description it will be seen that the above-mentioned embodiments have the effect of realizing an eyepiece capable of satisfactorily compensating various aberrations, particularly distortion aberration despite its extremely simple construction employing a reduced number of lenses, i.e., three lenses in two groups and having an apparent field of view of over 40° owing to the use of an aspherical surface for at least one of the lens surfaces of a second lens group. As a result, the device itself can be reduced in weight and size.

What is claimed is:

1. An eyepiece consisting of, in the order from an eyepoint side:

a first lens group having a positive refractive power; and a second lens group having a positive refractive power;

said first lens group being composed of a cemented lens formed by cementing a negative lens and a positive lens together, said second lens group being composed of another positive lens, said positive lens of said second lens group having at least one lens surface composed of an aspherical surface, said lens construction further satisfying the following conditions, $1.05 < f_1/f < 2.5$ $D/f < 0.9$ where f=the focal length of the eyepiece, $f_1$=the focal length of the first lens group, D=the spacing between the first and second lens groups.

2. An eyepiece according to claim 1, wherein the negative lens of said cemented lens is composed of a meniscus lens having a convex surface turned to said eyepoint side, wherein the positive lens of said cemented lens is composed of a lens having convex surfaces turned to both sides, and wherein the positive lens of said second lens group is composed of a lens having convex surfaces turned to both sides.

3. An eyepiece according to claim 2, wherein the positive lens of said second lens group is made of a resinous optical material.

4. An eyepiece according to claim 1, wherein the negative lens of said cemented lens is composed of a meniscus lens having a convex surface turned to said eyepoint side, wherein the positive lens of said cemented lens is composed of a lens having convex surfaces turned to both sides, and wherein the positive lens of said second lens group is composed of a lens having a lens surface which is composed of said aspherical surface and turned to said eyepoint side.

5. An eyepiece according to claim 4, wherein the positive lens of said second lens group is made of a resinous optical material.

* * * * *